June 5, 1934.   L. SNYDER   1,961,532
AUTOMATIC DOUGHNUT COOKING MACHINE
Filed June 10, 1932   3 Sheets-Sheet 1

INVENTOR
LOUIS SNYDER,
BY
ATTORNEY

June 5, 1934.   L. SNYDER   1,961,532
AUTOMATIC DOUGHNUT COOKING MACHINE
Filed June 10, 1932   3 Sheets-Sheet 2

INVENTOR
LOUIS SNYDER,
BY
ATTORNEY

June 5, 1934.  L. SNYDER  1,961,532
AUTOMATIC DOUGHNUT COOKING MACHINE
Filed June 10, 1932   3 Sheets-Sheet 3
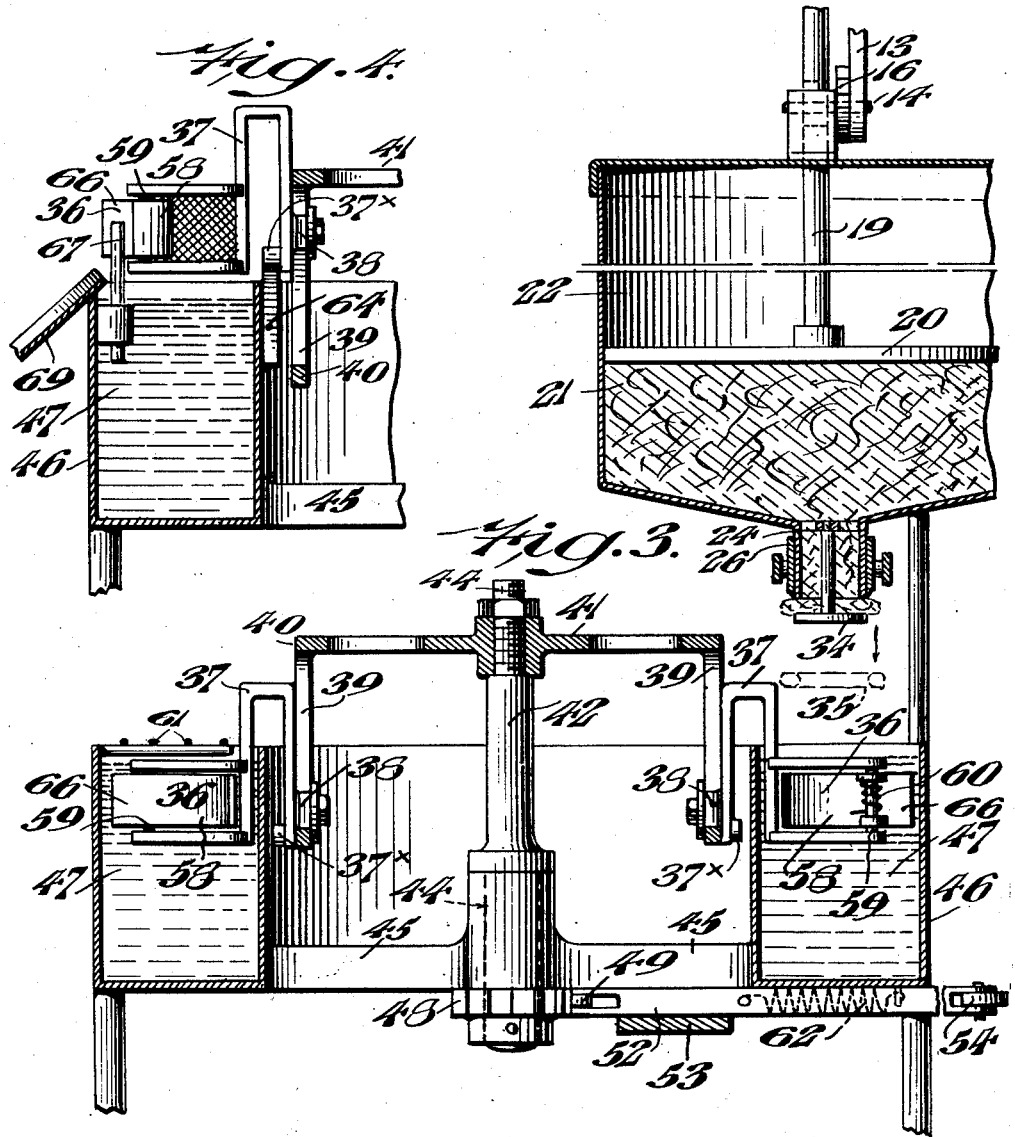
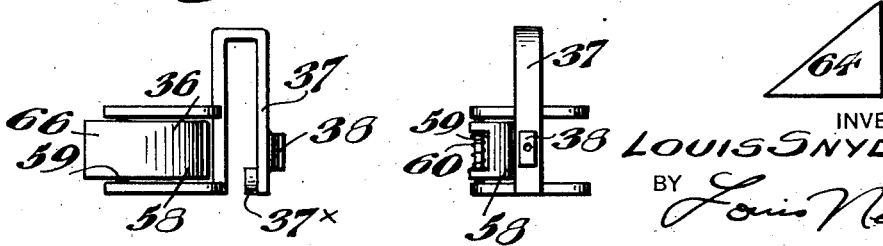
INVENTOR:
LOUIS SNYDER,
BY
ATTORNEY Patented June 5, 1934

1,961,532

UNITED STATES PATENT OFFICE 1,961,532

AUTOMATIC DOUGHNUT COOKING MACHINE

Louis Snyder, Philadelphia, Pa.

Application June 10, 1932, Serial No. 616,425

8 Claims. (Cl. 107—4)

My invention relates to a new and useful automatic doughnut cooking machine of the general type disclosed in such patents as Bergner 1,727,857; 1,768,737; 1,702,191; 1,665,017; 1,492,-542; 1,492,541; Tomlinson 1,320,662; Morris et al, 1,414,713, etc., whereby the dough from which doughnuts are made is formed into doughnuts and delivered into the hot grease, and whereby the doughnut is automatically cooked in submerged condition in the grease for a predetermined length of time, and whereby the cooked doughnut is automatically removed from the grease and ejected from the machine without the necessity of a manual operation and without the need of any attention.

Prior art doughnut machines of this character, of which the patents above cited are representative, have been made and used, but such devices have either been entirely too complicated or have been undesirable in other respects, in that the doughnut is permitted to float on the surface of the hot grease, thus making it necessary to provide means for turning the doughnut, which not only added to the machinery but also prolonged the time of the cooking and frequently resulted in breaking the doughnut or in other defective operation.

Other devices, such as the Bergner device disclosed in Patent No. 1,727,857, depend on the buoyancy of the doughnut to rise after the cooking operation is over, whereupon means is provided for shifting the floating doughnut to the path of means for removing it from the grease. Other prior art devices involve complicated and cumbersome machinery for cutting the dough into doughnuts, as witnessed by the Bergner Patent No. 1,702,191 and others.

It is with the object of obviating all of the foregoing disadvantages and providing an extremely simple mechanism for synchronously and automatically delivering an uncooked doughnut into the frying grease, positively submerging the doughnut in the grease, positively propelling the doughnut in the frying grease for a predetermined length of time and then positively elevating the doughnut from the grease and automatically ejecting it from the apparatus, that the various steps mentioned have been so correlated and synchronized as to produce a continuous and uninterrupted operation guaranteeing perfect results, without depending on the buoyancy of the doughnut to rise in the grease, the accuracy of the doughnut turning mechanism, and without the necessity of propelling the doughnut by producing currents in the hot grease, as is the case in the prior art expedients.

To the above ends, my invention consists of a single driving unit mechanism which operates means associated with the vat containing the prepared dough to extrude preformed doughnuts, means for severing the doughnuts to cause them to drop in the individual baskets, means for propelling said baskets in the hot grease, and means for elevating the baskets out of the grease to permit ejection of the cooked doughnuts from said baskets by other automatic means associated with said baskets and a discharge tray or chute.

My invention further consists of a circular pan adapted to contain the frying grease and a plurality of individual baskets or receptacles adapted to receive the preformed doughnut in the uncooked condition, said baskets being adapted to travel under the surface of the grease completely to submerge the doughnuts contained therein, and means for preventing the doughnut from rising out of the basket until the cooking operation has been completed and the doughnut is ready for ejection from the machine.

My invention still further relates to various other novel features of construction and advantage, all as hereinafter more fully described and claimed in connection with the accompanying drawings in which:

Figure 3 represents a section on line 3—3 of Figure 2.

Figure 4 represents a fragmentary section on line 4—4 of Figure 2.

Figures 5, 6, 7 and 8 represent details of construction which will be hereafter further described.

Figure 1:
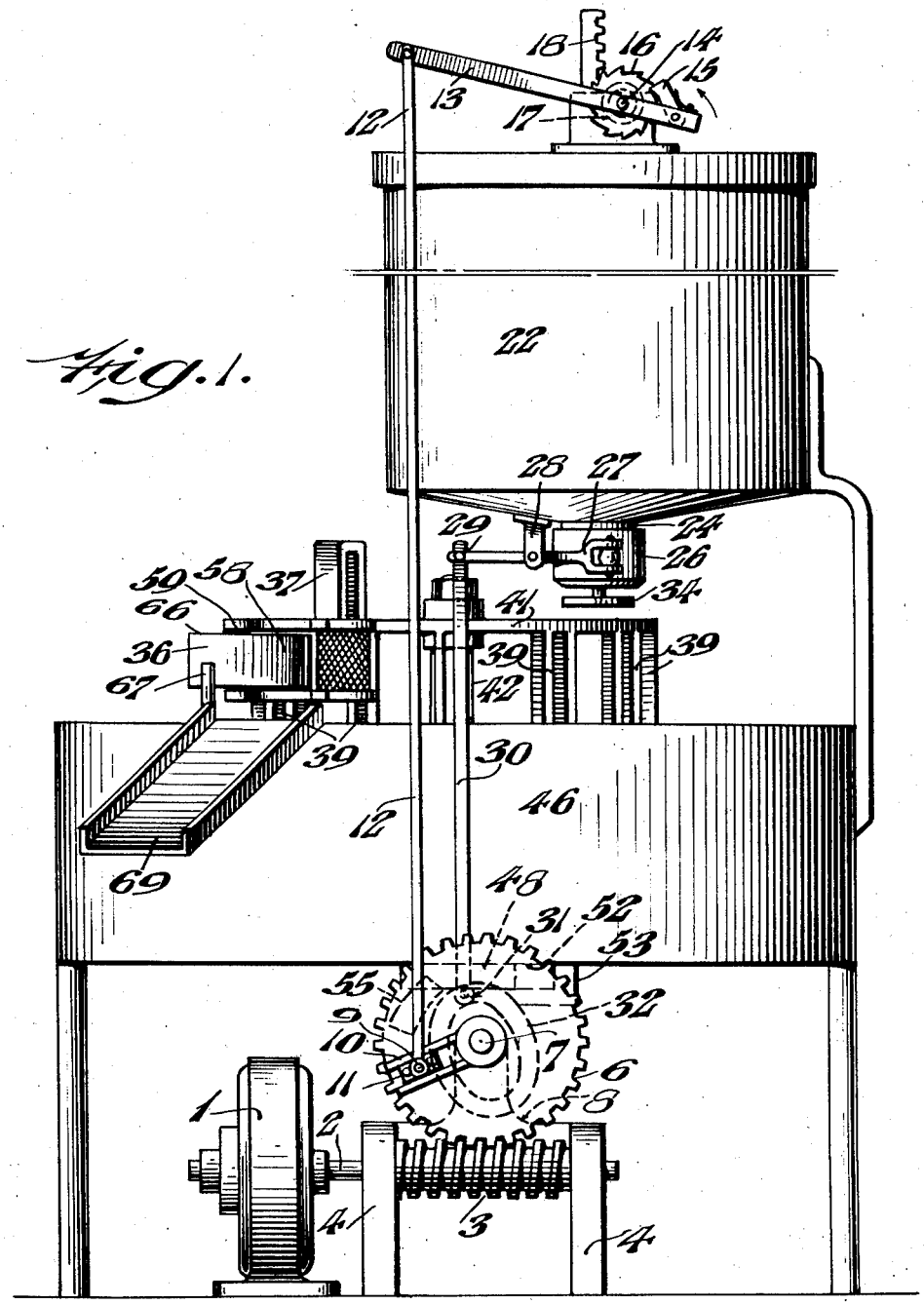
Figure 1 represents a side elevation of a doughnut cooking machine embodying my invention.
Figure 8:
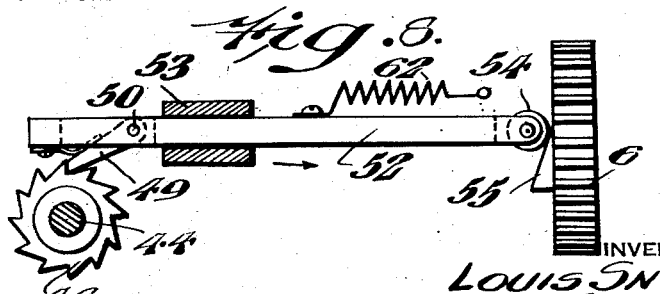

Referring to the drawings in which like reference characters designate like parts, 1 designates a motor or other source of driving power which revolves the shaft 2 which drives the worm 3 which is suitably journaled in the bearings 4. The worm 3 meshes with gear 6 on the shaft 7 which is suitably journaled in any bearing 8. Carried by the gear 6 is the yoke 9 which engages the roller 10 which travels on the anti-friction bearings 11. The roller 10 is at the bottom end of the rod or arm 12 which is pivoted at its upper end to the lever 13 which is fulcrumed on the shaft 14 and to the other end of which is pivoted the pawl 15. The pawl 15 is adapted to coact with the pinion 16 on the shaft 14. The pinion 16 carries the gear 17 which meshes with the rack 18 on the stem 19 of the plunger 20 which normally rests on the dough 21 in the vat 22. When the rod 12 is raised, the lever 13 is tilted to lower the pawl 15 to bring the latter into engagement with one of the teeth of the pinion 16. When, due to the continuous movement of the gear 6, the arm 12 is pulled down, it pulls down on the lever 13 thereby actuating the pawl 15 to revolve the pinion 16 in the direction of the arrows in Figure 1. This causes the gear 17 carried by the pinion 16 and which engages the teeth of the rack 18 to push the stem 19 and the plunger 20 upon the dough 21 to extrude some of the dough through the neck or nozzle 24, as shown in Figure 3. In order to cut the dough into a doughnut, I provide the annular cutter 26 which is carried by the lever 27 which is fulcrumed or pivoted in the bracket 28 carried by the bottom of the dough vat 22, the other end of the lever 27 being pivoted at 29 to the rod 30 which carries the bottom roller 31 which rides on the cam or eccentric 32 carried by the gear 6. Thus when the rod 30 is moved upwardly it will tilt the lever 27 by lowering the end thereof which carries the cutters 26 which will then sever the dough against the bottom stationary plate 34 which is carried in any suitable manner near the bottom of the nozzle 24. When the cutter 26 is moved down, an annular ring forming the doughnut 35 is cut which then drops off as illustrated in Figure 3 and the cutter temporarily closes the space intervening between the plate 34 and the bottom edge of the nozzle 24. In this position the plunger 20 is inactive and simultaneously with the next depression of the plunger 20 the annular knife 26 is raised to permit extrusion of some more dough to be cut to form the next doughnut. The doughnut 35 drops into a basket 36 which at the moment the doughnut 35 drops off the disc 34 is in vertical registration or alignment with the nozzle 24. The basket 36 is carried by a bracket 37 which bracket has the rear bottom lug 38 which engages and slides up and down in the slot 39 in the bracket 40 which bracket is carried by the spider 41 on the spindle 42. The spindle 42 is mounted on the shaft 44 and has the bottom hub 45 which carries the annular pan 46 which contains the hot frying grease 47. The shaft 44 carries the pinion 48 which is adapted to be engaged by the pawl 49 which is pivoted at 50 to the rod or arm 52 which is slidably mounted in the bracket 53 carried by the underside of the hub 45. The rod 52 carries at its inner end the roller 54 which is adapted intermittently to ride upon the cam 55 carried by the inner face of the gear 6. Each basket 36 is provided with an ejector 58 which is pivoted to one end of the basket as at 59 and which is normally tensioned by the spring 60. 61 designates a plurality of wires covering the entire surface of the pan 46 except for the points at which the doughnut 35 is introduced into the basket 36 and where the doughnut 35 is ejected from the basket 36 by the ejector 58. The rod 52 is tensioned by the spring 62 which is suitably anchored and which serves to pull the arm 52 in the direction of the arrow in Figure 8 to disengage the pawl 49 from the pinion 48 after the roller 54 has fallen off the cam 55.

Figure 2:
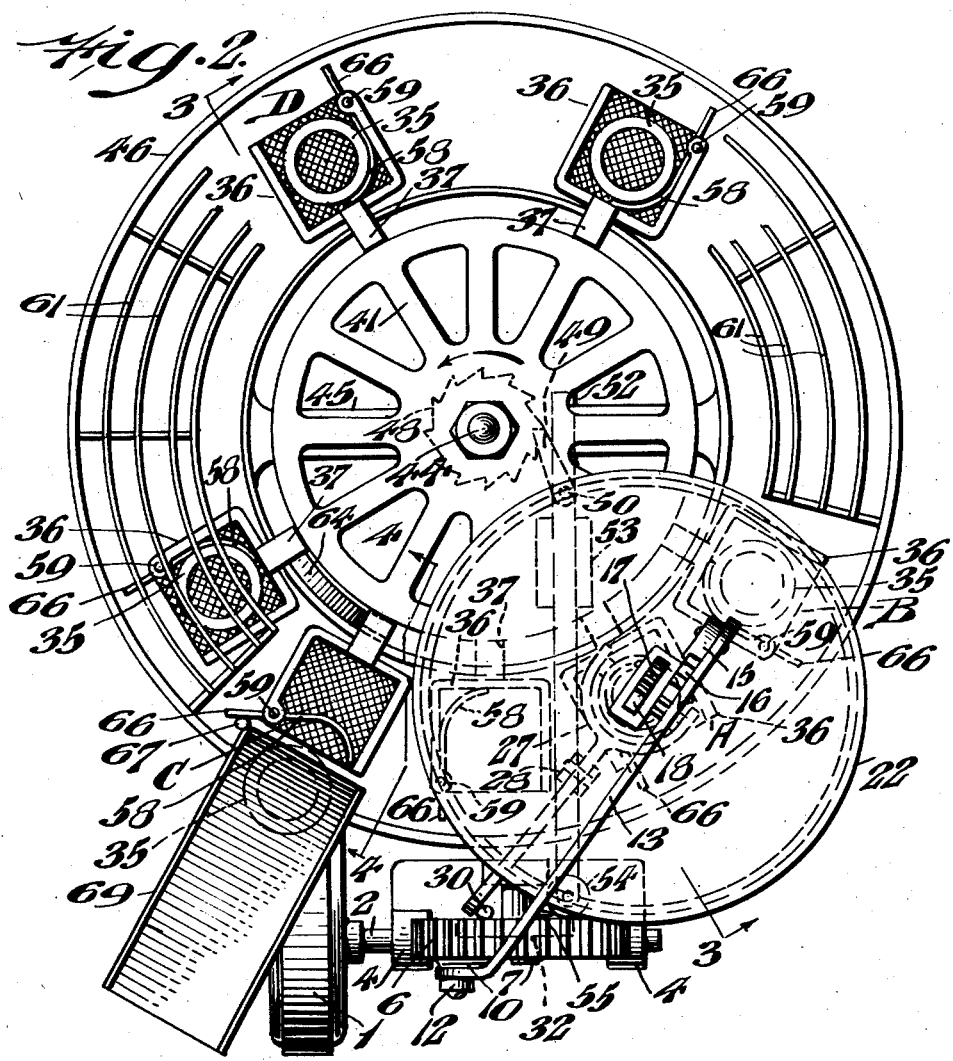
Figure 2 represents a plan view of Figure 1.

The operation is as follows: The preformed doughnut 35 resulting from the coaction of the plunger 20 and the cutter 26 actuated by the parts and in a manner heretofore described drops into a vertically aligning basket 36. The roller 54 at the end of the rod 52 then rises on the cam 55 on the gear 6, and the pawl 49 engaging the pinion 48 rotates the latter through one notch thus moving the basket into which the doughnut 35 has dropped out of alignment with the dough nozzle 24 and bringing the next succeeding basket 36 into position to receive the next doughnut extruded from the nozzle 24. It will be seen from Figure 3 that the basket 36 at the time of receiving the doughnut 35 is slightly below the level of the grease 47 in the pan 46. The basket 36 with the doughnut 35 therein then travels from the doughnut receiving position indicated as A in Figure 2 into the position indicated as B in the same figure, with the doughnut which is still in its heavy dough form resting in the bottom of the basket and fully submerged in the hot frying grease. As the doughnut containing basket travels in the hot grease and before the doughnut has been sufficiently cooked to become buoyant the basket 36 is forced to travel under the wires 61 which prevent the doughnut 35 from rising out of the basket. The basket containing the doughnut is formed of any suitable perforated enclosure, such as bottom and side walls formed of wire netting or of grill work or the like, so that the hot frying grease may have complete and free access to the inside of the basket to cook the doughnut. The basket 35 then travels under the doughnut retaining wires 61 from the positions indicated as A and B through the intervening positions until the basket arrives at the position indicated as C at which point the basket emerges from under the doughnut retaining wires 61 which terminate in advance of the position C and simultaneously with the termination of the wires 61 the basket 36 rides on a cam 64 which positively elevates the basket 36 out of the hot grease, as best shown in Figure 4. During the travel of the basket 35 over the cam 64 a chance is afforded for draining the excess grease from the doughnut so that when it is discharged it is relatively dry. The doughnut 35 is discharged from the basket 36 at the position C by means of the ejector 58 which tensioned by the spring 60 is normally in the position shown at D. When the basket 36 has reached the ejecting position C, the handle 66 of the ejector 58, projecting as it does beyond the outer edge of the basket 36, impinges upon the stop 67 and brings the ejector 58 from the position shown at D into the ejecting position shown at C whereupon the doughnut 35 is ejected from the basket 36 on to the chute or incline tray 69. After the basket 36 has passed the ejecting position shown at C, in which it aligns with the chute 69, the spring 60 immediately returns ejector 58 into the position shown at D, namely: into a position in contact with the side walls of the basket 36. When the doughnut 35 has been ejected from the basket 36, as above explained, the empty basket 36 is, due to the action of the rod 52, pawl 49, pinion 58 on the shaft 44, revolved by intermittent motion until it again registers with the nozzle 24 to receive another doughnut 35 and to repeat the operation so that one basket 36 and another basket 36 are simultaneously ejecting cooked and receiving uncooked doughnuts in one continuous operation, the time consumed by the baskets in traveling through the grease being calculated to complete the cooking of the doughnuts. Simultaneously with the actuation of the baskets in intermittent circular fashion to receive uncooked doughnuts and to eject the cooked ones the dough extruding and cutting mechanism is actuated synchronously so as to extrude and cut an uncooked doughnut which would be ready to drop into an empty basket in alignment with the nozzle 24. It is to be noted that the synchronized operation of the doughnut extruding machine and the doughnut cutting apparatus, as well as the propulsion of the baskets to receive the uncooked doughnuts and to carry said doughnuts through the grease for a predetermined time, as well as the elevation of the baskets to permit straining and ultimate ejection of the cooked doughnut, are all effected by a driving mechanism which is extremely efficient and accurate and which is of the simplest possible construction. The brackets 37 supporting the basket 36 are preferably provided with rollers 37x for riding on the cam 64 for the raising of the basket from the position shown in Figure 3 to the position shown in Figure 4. The basket 36 after ejection therefrom of the doughnut 35, as illustrated in Figure 2, drops off the cam 64 into the submerged position shown in Figure 3 and in which it is ready to receive another doughnut 35 to be cooked in the liquid 47. I have purposely not specified any number of baskets or cooking receptacles 36, since any number whatsoever may be used, it being merely necessary to adjust the driving mechanism in relation to the number of receptacles 36 used and in relation to the length of time required for proper cooking of the doughnut.

While I have hereinabove described my invention as pertaining to a doughnut machine, it is to be understood that this is by way of illustration and not by way of limitation, since my machine, as above disclosed is equally adaptable for the automatic forming and cooking of all other fried foods from pancakes to fish cakes.

Having thus described my invention, what I claim as new and desire to secure by Letters Patent is:

1. In a machine of the character stated, means for extruding a portion of material to be cooked, a pan containing the cooking liquid, a fenestrated receptacle submerged in said liquid and adapted to receive said portion to be cooked in said liquid, means for vertically elevating said receptacle from said liquid when the cooking operation is completed, and means within said receptacle for ejecting the cooked portion therefrom.

2. In a machine of the character stated, a vat containing prepared material for making doughnuts or the like, a pan positioned below said vat and containing a cooking liquid, a plurality of fenestrated receptacles adapted normally to travel in said pan below the level of said liquid, means for extruding portions of said material from said vat into said receptacles, means for propelling said receptacles through said cooking liquid, means for successively vertically elevating said baskets above the level of said liquid, and means within said receptacles for ejecting the cooked portions from said receptacles while the latter are in the elevated position above the level of said liquid.

3. In a machine of the character stated, a vat containing material for making doughnuts or the like, a nozzle for said vat, means for extruding portions of said material through said nozzle, means associated with said nozzle for severing the extruded portions, a pan containing a cooking liquid, a plurality of fenestrated receptacles adapted to travel intermittently in said liquid within said pan, whereby each of said receptacles is brought into alignment with said nozzle to receive an extruded portion, means for preventing said portions from rising above the level of said liquid, a single driving mechanism for synchronously and automatically actuating the means for extruding said portions and for propelling said receptacles through said cooking liquid, means for vertically elevating said receptacles successively above the level of the liquid to permit draining and ejection of the cooked portions in said receptacles, and means within said receptacle for automatically ejecting said cooked portions.

4. A machine of the character stated, comprising a vat containing the prepared dough for making doughnuts or the like, a bottom nozzle for said vat, a plunger within said vat for intermittently extruding portions of said material through said nozzle, means associated with said nozzle for severing the portion extruded therethrough in ring shaped formation, a pan containing a cooking liquid, a plurality of fenestrated receptacles normally traveling below the level of said liquid and adapted to receive the portions extruded through said nozzle, a single driving mechanism for actuating said plunger and said severing means and for propelling said receptacles through said liquid, means for raising each receptacle at the end of the cooking operation to a point above the level of the cooking liquid, and means within each receptacle for ejecting the cooked portion from each receptacle while the latter is in its raised position, each of said receptacles automatically dropping into submerged position in said cooking liquid upon the ejection of the cooked portion therefrom.

5. A doughnut frying machine of the character stated, comprising a vat containing the prepared dough, a bottom outlet for said vat, a plunger within said vat for intermittently extruding the dough therefrom through said outlet, cutting means associated with said bottom outlet adapted to cut the dough extruded through said outlet in the form of doughnuts, a frying pan containing the frying liquid, a plurality of fenestrated receptacles normally positioned below the level of said liquid and adapted to receive said doughnuts, a single driving mechanism for actuating said plunger and said cutting means and for propelling said receptacles through said liquid, means for vertically raising each receptacle at the end of the frying operation to a point above the level of the frying liquid, an automatic ejecting mechanism associated with each of said receptacles and being adapted to be actuated only when the receptacle is in its raised position for ejecting the cooked doughnut from said receptacle, and a guard extending over the entire area of the frying pan except at the points at which a dough is introduced into a receptacle and at the point at which the doughnut is ejected from said receptacle to prevent the doughnuts contained in said receptacles from floating out therefrom during the travel of said receptacles through said frying liquid.

6. In a machine of the character stated for frying doughnuts and the like, a vat containing the prepared dough, means for extruding and severing predetermined portions of said dough in the form of doughnuts or the like, a pan containing a frying liquid, a plurality of receptacles adapted successively to receive said doughnuts as they are extruded from said vat, and a driving mechanism for actuating said dough extruding and severing mechanism and for propelling said receptacles through said frying liquid comprising a single drive shaft, a gear on said shaft, a plurality of cams carried by said gear, and driving connections intermediate said cams and the dough extruding and severing mechanisms and the receptacle propelling mechanism.

7. In a machine of the character stated, a vat adapted to contain a cooking liquid, a receptacle submerged in said liquid and adapted to receive and hold the article to be cooked, means for propelling said receptacle through said liquid, means for raising said receptacle vertically from said liquid when the cooking operation is completed, an ejecting trip lever normally in inoperative position within said receptacle, and means for actuating said lever when said receptacle is raised to eject therefrom the cooked article.

8. In a machine of the character stated, a vat adapted to contain a cooking liquid, a receptacle submerged in said liquid and adapted to receive and hold the article to be cooked, means for propelling said receptacle through said liquid, means for raising said receptacle vertically from said liquid when the cooking operation is completed, a spring tensioned ejecting trip lever normally in inoperative position within said receptacle, and fixed means for actuating said lever when said receptacle is raised to eject therefrom the cooked article.

LOUIS SNYDER.